Jan. 28, 1958     L. C. FOSTER     2,821,656
ELECTRONIC DEVICE
Filed April 18, 1955     2 Sheets-Sheet 1

INVENTOR.
LEIGH CURTIS FOSTER
BY James E. Toomey
ATTORNEY

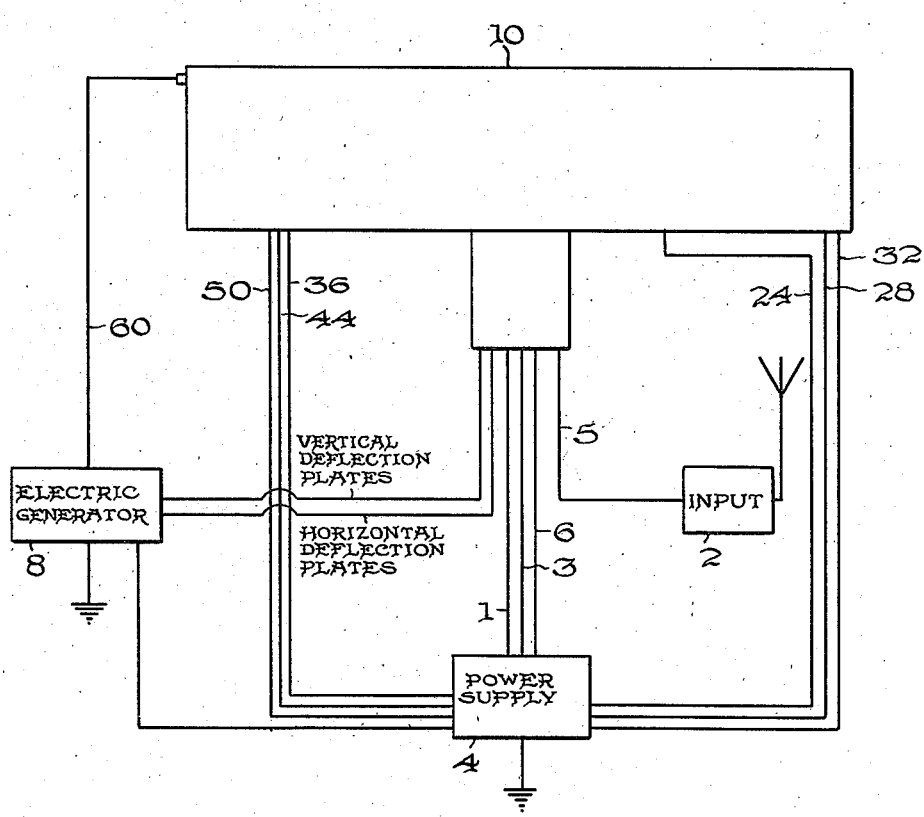

United States Patent Office 2,821,656
Patented Jan. 28, 1958

2,821,656

ELECTRONIC DEVICE

Leigh Curtis Foster, Westmount, Quebec, Canada, assignor, by mesne assignments, to Kaiser Industries Corporation, a corporation of Nevada Application April 18, 1955, Serial No. 502,109

23 Claims. (Cl. 315—23)

This invention relates to a cathode ray tube and more particularly to a polar coordinate cathode ray tube structure adapted for use in radar systems.

A polar coordinate type cathode ray tube structure as known in the art has particular application in its use as a so-called memory or storage tube. In such use the tube is primarily adapted to store a clear, distinct image from one scan to another, whereby it is possible to simultaneously visually compare several sets of signals on the target. Storage tubes have been particularly successful in their use in electronic navigational aids for pilots (aircraft cockpit weather mapping), television film conversion, radar scan conversion, digital and analog computers, moving target indication radar and band width reduction.

Many of these applications require a tube which is of small, compact structure. A particular example of such problem is evidenced in the utilization of such type of tube in the provision of electronic navigational aids for aircraft use.

The advent of radar navigational systems for use in aircraft has brought about a tremendous number of advantages enabling the pilot to be visually cognizant of objects in the region of the aircraft, such as mountains, other aircraft, and prominent structures. Among the ever present problems in the present high velocity aircraft is the accommodation of the necessary navigational equipment components. The design of the present day high velocity aircraft is dictated by the physics of aerodynamics which demands exceedingly smaller cross-sectional contours in order to obtain the required streamlining for decreasing the wind resistance or drag, thereby increasing the potential velocity of the aircraft. Manifestly, the decrease in cross-sectional dimensions of the aircraft has necessitated that the equipment for operating and navigating the aircraft be positioned within a correspondingly more compact area.

The conventional cathode ray tube utilized in the conventional radar systems for navigation has presented a rather insurmountable problem. In order to reduce the longitudinal dimensions of the tube, a corresponding reduction must be made in the diameter of the fluorescent viewing area of the tube. Attempts have been made in the prior art to reduce the length of the dimension from the electron gun to the fluorescent image screen in an effort to decrease the overall space requirements of the conventional cathode ray tubes. However, one of the problems introduced thereby is the fact that in decreasing the gun-to-screen dimension, it became necessary to curve the image screen so that the length of travel of the electrons from their source to the various portions of the screen would be substantially equal throughout the entire scanning procedure in order to present an undistorted representation on the screen. Manifestly, if a very large image screen were required, it would have to be curved a considerable amount, thereby resulting in a tube shape of awkward and cumbersome configuration.

With the knowledge of these disadvantages, the applicant has produced a polar coordinate cathode ray tube which has overall dimensions considerably smaller than the dimensions of the known types of cathode ray tubes, yet is still capable of energizing an equally large image screen as utilized by the conventional tube.

The preferred embodiment of the invention contemplates a polar coordinate cathode ray tube which comprises an evacuated envelope and a target electrode disposed therewithin having a surface thereof opposite the electron source coated with a fluorescent material adapted to emit light when excited by an impinging beam of electrons. A conventional electron source disposed within the envelope is adapted to deliver a beam of electrons along a path toward the target. Electrostatic means are provided to cause the beam to be rotated, preferably through 360°, and additional means are provided to bend the beam so as to cause it to travel radially outward along and parallel to the surface of the target opposite the coated surface. An electrostatic deflection means is provided to cause the beam to bend completely around the edge of the target electrode so the beam will travel along a path substantially parallel to the fluorescent coating. Finally, there is provided a plurality of optically transparent deflection means which may be selectively energized to cause the beam to be deflected and impinge upon the fluorescent coating. It will be obvious that the tube can be employed as a travelling wave tube, in which case, the raster is repeatedly provided.

The invention will now be described in more detail as applied to the specific cathode ray tube including several embodiments; it should, however, be understood that the invention is not limited to the particular embodiments disclosed hereinafter and that its scope is defined by the appended claims.

Figure 3 is a block diagram of a system incorporating the polar coordinate tube.

Figure 1:
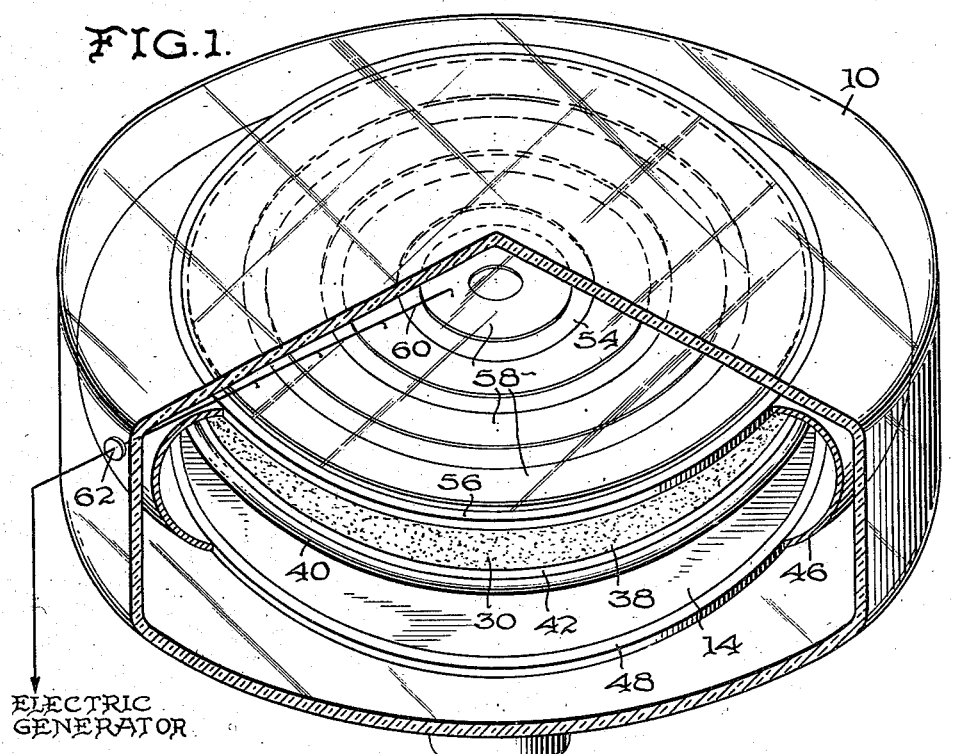
Figure 1 is a partially cut-away perspective view of the cathode ray tube.
Figure 2:
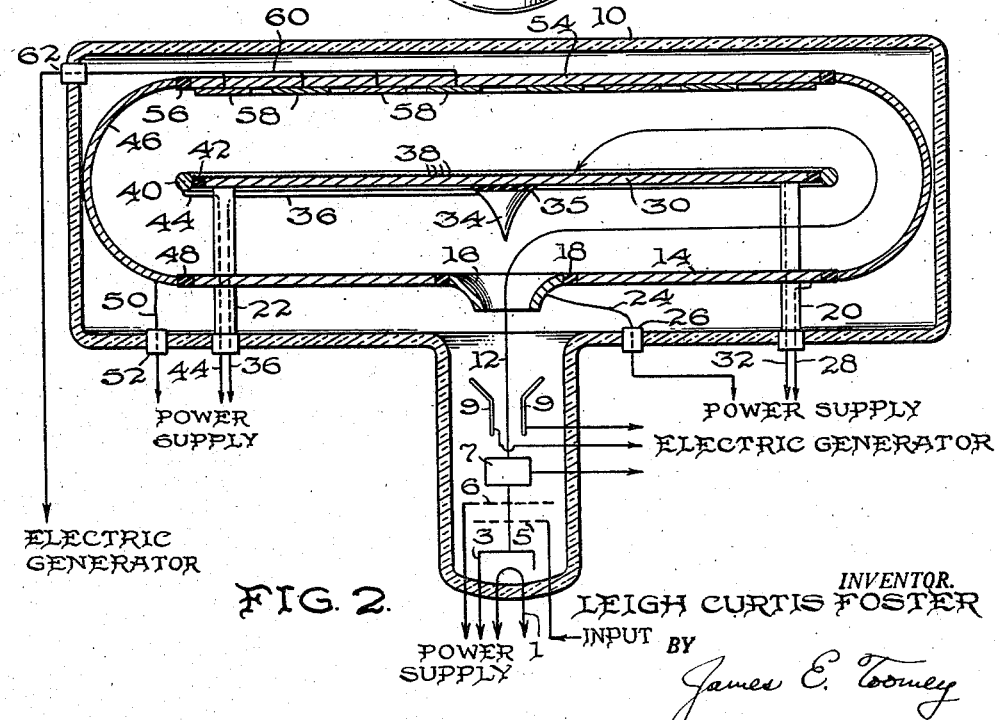
Figure 2 is a sectional view of the tube showing various electrical connections schematically.

Referring to Figures 1 and 2, disposed within an evacuated envelope 10, there is arranged a heater or filament 1, a cathode 3, a control electrode 5, an accelerating electrode 6, a pair of horizontal deflection plates 7, and a pair of vertical deflection plates 9 which together comprise a conventional electron gun arrangement for producing a beam of electrons along a path. The horizontal deflection plates 7 and the vertical deflection plates 9 are suitably energized by the electric generator 8 as shown in Figure 3. The filament 1, the cathode 3, and the accelerating electrode 6 are suitably energized from the power supply 4 as shown in Figure 3.

An apertured plate 14 is disposed within the enlarged portion of the tube 10 and positioned transversely with respect to the emergent electron beam 12. An annular electrode 16 is disposed within the aperture formed in the plate 14 and insulatingly spaced therefrom by an insulator collar 18. The plate 14 is maintained in spaced relation from the side wall of the envelope 10 by means of hollow insulating rods 20 and 22. The electrode 16 is energized through an electrical conductor 24 which in turn is connected to the power supply 4 outside the tube envelope through a vacuum tight seal 26. The plate 14 is properly energized from the power source 4 outside the tube envelope through a conductor 28 which is adapted to pass through the hollow portion of the rod 20.

A target plate 30 is positioned within the envelope 10 in spaced relation from and substantially parallel to the plate 14. In order to maintain the spaced relationship between the plate 30 and the plate 14, the plate 30 is disposed at the terminal portions of the insulating rods 20 and 22. Potential is applied to the plate 30 from the power supply 4 through an electrical conductor 32 which is adapted to be received and pass through the hollow portion of the insulating rod 20. An electrode 34 is mounted on the surface of the plate 30 adjacent the electron beam source and is energized through a conductor 36 which in turn is connected to the power supply 4 outside the tube envelope through the hollow portion of the insulating rod 22. Insulating member 35 is provided to be disposed intermediate the electrode 34 and the surface of the target plate 30 to suitably insulate the electrodes from one another.

On the opposite surface of the plate 30 there is provided a coating 38 of fluorescent material which is capable of emitting light when struck by a beam of electrons. An annular electrode 40 is affixed to the periphery of the plate 30 and insulated therefrom by an insulating annulus 42. The electrode 40 is energized from the power supply 4 outside the tube envelope through conductor 44 which passes through the hollow portion of the insulating rod 22.

An annular electrode 46 is disposed within the tube envelope 10 and circumferentially spaced from the electrode 40. The electrode 46 is semicircular in cross-section and concentric with the electrode 40. One of the free peripheral edges of the electrode 46 is insulatingly affixed to the peripheral edge of the plate 14 by an insulating annulus 48. Potential is applied to electrode 46 through an electrical conductor 50 from the power supply 4 outside the tube wall. The conductor 50 is adapted to pass through the tube wall through a vacuum tight seal 52.

A transparent disc 54 is positioned within the envelope 10 in spaced relation from the plate 30 and has its peripheral edge affixed to the free peripheral edge of electrode 46 by an insulating annulus 56. A plurality of annular optically transparent electrostatic deflection electrodes 58 are affixed to the surface of the transparent disc 54 adjacent the plate 30. Potential is applied to the electrodes 58 from an electric generator 8 outside the tube envelope through electrical conductors 60 which pass through a vacuum tight seal 62 situated in the wall of the envelope 10.

Figure 3 shows in diagrammatic form a system which incorporates the polar coordinate tube 10. It will be noted that an incoming signal is received by an antenna and fed through an input stage 2 to the control grid 5 of the electron gun.

A power supply 4 is provided to supply potentials to the various electrodes of the polar coordinate tube through their respective electrical conductors. Also, it will be noted that the power supply 4 is adapted to energize the electric generator 8 which in turn is electrically coupled to the horizontal and vertical deflection plates 7 and 9 respectively of the electron gun. The electric generator 8 is further adapted to supply the desired energization to the transparent deflection electrodes 58 (Figure 2) through electrical conductors 60.

In operation, the electron beam 12 is directed to pass through the electrostatic field established by the horizontal and vertical deflection plates 7 and 9 respectively. By applying suitable varying potentials to these deflection electrodes, the electron beam 12 may be caused to rotate about its longitudinal axis. It will be discerned that the beam 12 could also be caused to rotate by other means such as an electromagnetic means rotatably mounted around the neck of the envelope.

Suitable potentials are impressed upon the electrodes 16 and 34 to cause the electron beam 12 to bend through substantially 90° and travel in a path radially outward therefrom. It will be discerned that the electrode 16 must have a potential impressed thereon which is positive with respect to the beam or cathode potential and the potential impressed upon an electrode 34 must be negative with respect to the beam or cathode potential, thereby causing the beam to bend through substantially 90° and travel along a radial path intermediate the plate 14 and plate 30. In order to present a "field-free zone" to the electron beam as it travels intermediate the plate 14 and plate 30, proper positive potentials with respect to the beam potential are applied equally to each of the plates 14 and 30. Accordingly, the electron beam 12 may travel radially outward away from the electrodes 16 and 34, between and substantially parallel to the plates 14 and 30. By virtue of the "field-free" zone established by the plates 14 and 30, no spurious electric fields will be present to interfere with the beam travel.

The electrodes 40 and 46 cooperate together to form an electron lens arrangement adapted to bend the electron beam 12 through substantially 180° and cause the beam to travel along a path intermediate the target plate 30 and the set of deflection electrodes 58. A suitable negative potential with respect to the beam potential is applied to the electrode 46 and a likewise suitable positive potential with respect to the beam potential is applied to the electrode 40 to effect the desired beam deflection. The energy and forward velocity of the electron beam 12 is sufficient to cause the beam to traverse the entire radius of the target plate 30 and due to the rotation effected thereon by the rotating electrostatic field, the beam will be caused to rotate or sweep through 360° in a plane parallel to that of the target. A sequential signal is applied successively to each deflection electrode 58 by an electric generator, shown diagrammatically in the drawings. As the beam 12 reaches the proximity of the central portion of the target plate 30, a signal is applied to the innermost annular transparent electrode 58 which establishes a negative field with respect to the cathode potential of the electron source in the center region of the target and causes the beam to be deflected toward and impinge upon the fluorescent coating 38. The impinging electrons will cause the fluorescent material to become excited and give off a luminescent signal in the form of light. This resulting luminescence may be then effectively viewed from a point outside the tube 10 through the transparent deflection electrodes 58 and the transparent disc 54.

Assuming that a negative potential is applied to the outermost of the deflecting electrodes 58, the impinging electrons will exhibit an annulus of luminescence of a constant radius due to the 360° sweep of the beam. However, in actual practice, the potentials applied to the deflection electrodes 58 are successively applied by the electric generator causing the electron beam to be deflected and impinge on radial portions of the target successively away from its center, thereby effecting excitation of the phosphor on substantially every portion of the fluorescent area of the target electrode 30. When complete scanning of the target has been accomplished, the deflection electrodes are recharged by auxiliary means so that the beam may travel once again to the center of the target and commence another scanning operation. However, the operation of the tube may readily be reversed, in which case the entire array of deflection electrodes 58 is initially maintained negative with respect to the cathode potential of the electron gun. Accordingly, the beam will be caused to be deflected initially along the peripheral portions of the target 30. Next the outermost deflection electrode 58 will be recharged by auxiliary apparatus until the potential thereon is substantially equal to the potential of the target plate 30 establishing thereby a field-free region defined by the recharged deflection electrode and the target plate. The beam is enabled to travel through the field-free region until it enters the deflecting field or force established by the next adjacent deflection electrode 58. This action is continued until the beam has been caused to scan the entire target area at which instant the outermost deflection electrode 58 is once again driven negative with respect to the beam, commencing another scanning operation.

It must be noted that the intensity of the luminescence at any one point where the beam impinges on the fluorescent coating 38 is controlled by the intensity of the incoming signal which is impressed on the control electrode 5. The more negative the signal impressed thereon, the less dense is the resulting beam of electrons, and a corresponding decrease in the amount of luminescence will be exhibited on the fluorescent coating.

What is claimed is:

1. An electron discharge device comprising an electron sensitive target, means for delivering an electron beam along a path in a direction toward said target, means for deflecting the beam from said path prior to advance of same to the plane of said target to a second path which extends adjacent and in spaced relation with a first surface of the target, means for deflecting the beam from said second path to a third path which extends adjacent and in spaced relation with a second surface of the target, and means for deflecting the beam successively at different positions from said third path into impingement with various portions of said second surface of the target.

2. An electron discharge device comprising a target, a deflection set disposed in spaced relation with a first surface of said target, means for delivering an electron beam along a path in a direction toward a second surface of the target, means for deflecting the beam from said first path prior to advance of same to the plane of said target to a second path which extends adjacent the second surface of the target, and means for deflecting the beam from the second path to a third path which extends between said deflection set and said first target surface.

3. An electron discharge device comprising a target, a deflection set disposed in spaced relation with said target, means for delivering an electron beam in a direction toward the target, means for bending the beam in a direction toward the peripheral edge of said target along a plane substantially parallel to and spaced from said target, and means for bending the beam from said plane to a second plane substantialy parallel to said target and intermediate said target and said deflection set for deflection onto said target by said deflection set.

4. An electron discharge device comprising a target, a plurality of deflection electrodes disposed in spaced relation with said target, means for delivering an electron beam along an initial path in a direction toward the target, means disposed between said target and said means for delivering an electron beam for defining a field-free region adjacent and co-extensive with said target, means for directing the beam from its initial path into the field-free region, and means for directing the beam as it leaves the field-free region into the space between said plurality of deflection electrodes and said target for deflection of said beams onto said target by said deflection electrodes.

5. An electron discharge device comprising a target, a plurality of deflection electrodes disposed in spaced relation with one surface of said target, an electrode disposed in spaced relation with the second surface of said target, a beam source for directing a beam from said source along a path which lies in the space between said target and said electrode, and means for directing the beam from said first path to a second path which lies in the space between said plurality of deflection electrodes and said target for deflection of said beam into registration with said target by said deflection electrodes.

6. An electron discharge device comprising a target, a plurality of annular transparent deflection electrodes disposed in spaced relation with one surface of said target, an annular electrode disposed in spaced relation with the opposite surface of said target, means for delivering an electron beam along a path toward said target, means for deflecting the beam from said path along a second path in the space between said target and said annular electrode, and means for deflecting the beam from said second path into the space between said target and said plurality of transparent deflection electrodes for deflection into registration with said target by said deflection electrodes.

7. A cathode ray tube comprising an electron sensitive target, a deflection set adjacent to and spaced from a first surface of said target, a rotating electron beam source, means for directing the rotating beam along a successive set of paths in an area adjacent a second surface of said target which extend to the peripheral edge of said target, and a curved electron lens means spaced from the peripheral edge of said target for directing the beam from the first set of paths to a second set of paths in the space between said first surface of the target and said deflection set for deflection of said beam onto said target by said deflection set.

8. A cathode ray tube comprising an electron sensitive target, means for delivering an electron beam along a path adjacent and in spaced relation with the rear surface of said target, a plurality of transparent deflection means adjacent and in spaced relation with the front surface of said target, a curved lens for deflecting the beam from the first path to a second path which extends in the space between said target and said deflection means, and means for applying potentials to each of the deflection means in a selective manner for deflecting the beam from said second path into impingement with said target.

9. A cathode ray tube comprising an electron sensitive target, a set of radial transparent deflection electrodes disposed between the viewer and said target, an electron beam source for delivering a beam of electrons toward the peripheral edge of said target, and a curved electron lens means disposed at the peripheral edge for directing the beam into the space between said deflection electrodes and said target for deflection of said beam onto said target by said deflection electrodes.

10. A cathode ray tube comprising an electron sensitive target, means for delivering an electron beam along a path adjacent and in spaced relation with the rear surface of said target, a plurality of transparent electrically conducting glass deflection means disposed in adjacent and spaced relation with the front surface of said target, and a curved lens for deflecting the beam from the first path into the space between said target and said deflection means for deflection of said beam onto said target by said deflection means.

11. An electron space discharge device comprising an electron sensitive image screen, a beam bending electron lens extending coextensively with at least a portion of one edge of said screen, an electron beam source for directing a beam in the direction of said lens, a beam deflection set disposed between the viewer and the screen, and means for applying beam deflecting forces to said lens to effect the deflection of the beam thereby into the space between said beam deflection set and said screen for deflection of said beam onto said screen by said deflection set.

12. An electron space discharge device comprising an electron sensitive image screen, a beam bending electron lens extending coextensively with at least one edge of said screen, an electron beam source for directing a beam in the direction of said lens, a beam deflection set disposed between the viewer and the screen, means for applying beam deflecting forces to said lens to effect deflection of the beam into the space between said electrodes and said screen, and means for applying deflection forces to the deflection set to effect bending of the beam into point registration with the target.

13. An electron space discharge device comprising an electron sensitive image screen, a beam bending electron lens extending substantially coextensively with one edge of said screen, an electron beam source for directing a beam in the direction of said lens, a plurality of transparent deflection members disposed between the viewer and the screen, means for applying deflecting forces to said lens to effect deflection of the beams into the space between said electrodes and said screen, and means for selectively effecting application of beam deflection forces to different ones of said deflection members to effect bending of the beam into point registration with correspondingly different parts of the screen.

14. An electron discharge device comprising a target, means for directing a beam along a first path which lies in adjacent spaced relation with one surface of said target, means for bending said beam from said first path to a second path which lies in adjacent spaced relation with the second surface of said target, and deflection means operable to deflect said beam from said second path in the direction of and into registration with the second surface of said target.

15. An electron discharge device comprising a target means for directing a beam along a first path which lies in adjacent spaced relation with one surface of said target, means for deflecting said beam from said first path to a second path which lies in adjacent spaced relation with the second surface of said target, and deflection means for applying deflecting forces to said beam at different intervals along its second path to bend same in the direction of, and into point registration with different portions of, the second surface of said target.

16. An electron discharge device comprising a target means for directing a beam along a first path which lies in adjacent spaced relation with one surface of said target, means for deflecting said beam from said first path to a second path which lies in adjacent spaced relation with the second surface of said target, and deflection means operable to successively deflect said beam at different intervals from said second path in the direction of and into registration with correspondingly different points on the second surface of said target.

17. An electron discharge device comprising a target, means for directing a beam along a first path which lies in adjacent spaced relation with one surface of said target, means for deflecting said beam from said first path to a second path which lies in adjacent spaced relation with the second surface of said target, a plurality of deflection means, and means for selectively applying deflecting forces to the different deflection beam to selectively deflect said beam from said second path in the direction of and into point registration with correspondingly different portions of the second surface of said target.

18. An electron discharge device comprising a target means for directing a beam along a first path which lies in adjacent spaced relation with one surface of said target, means for bending said beam from said first path into a plane substantially parallel with and in facing relation with the second surface of said target, means for sweeping said beam within said plane, and deflection means operable to deflect said beam successively at different intervals thereof to direct same from said plane and into registration with correspondingly different intervals of the target.

19. An electron discharge device comprising a target, means for directing a beam along a first path which extends perpendicular to and substantially centrally of a first surface of the target, means for deflecting said beam prior to registration with the target to a path which lies adjacent and in spaced relation with said first target surface, means disposed in spaced relation with a target edge for deflecting said beam from said first path to a second path which lies in adjacent spaced relation with the second surface of said target, and deflection means operable to deflect said beam from said second path in the direction of and into registration with the second surface of said target.

20. A method of presenting a visual signal on an electron sensitive target which comprises delivering a beam along a first path which lies in adjacent spaced relation with one side of said target, bending said beam from said first path to a second path which lies in adjacent spaced relation with the second surface of said target, and thereafter applying deflecting forces to said beam at different intervals along the second path to deflect same into registration with correspondingly different points of the second surface of said target.

21. A method of presenting a visual signal on an electron sensitive target which comprises sweeping a beam in adjacent spaced relation with one side of said target, bending the end of said sweeping beam about one edge of the target into a plane which lies in adjacent spaced relation with the second surface of said target, to thereby effect sweeping of the beam through said plane and thereafter applying deflecting forces to said sweeping beam at different intervals to deflect same into registration with correspondingly different points of the second surface of said target.

22. An electron space discharge device comprising an electron sensitive target, an array of concentric annular deflection electrodes disposed in spaced relation with said target, means for directing a beam inwardly from a point adjacent the peripheral edge of the array toward the center of the array, and means for energizing said annular electrodes to effect deflection of the beam from its path into registration with the target at different points thereon.

23. A device as set forth in claim 22 which includes means for rotating the point of entry of the beam around the peripheral edge of the array.

References Cited in the file of this patent

UNITED STATES PATENTS

| | | |
|---|---|---|
| 2,075,379 | Varian | Mar. 30, 1937 |
| 2,513,742 | Pinciroli | July 4, 1950 |
| 2,617,876 | Rose | Nov. 11, 1952 |